United States Patent
Gao et al.

(10) Patent No.: US 7,845,864 B2
(45) Date of Patent: Dec. 7, 2010

(54) COVER ASSEMBLY

(75) Inventors: Jin-Feng Gao, Shenzhen (CN); Yong Jiang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 166 days.

(21) Appl. No.: 12/353,336

(22) Filed: Jan. 14, 2009

(65) Prior Publication Data

US 2010/0061714 A1 Mar. 11, 2010

(30) Foreign Application Priority Data

Sep. 5, 2008 (CN) .................. 2008 1 0304381

(51) Int. Cl.
*G03B 17/00* (2006.01)
(52) U.S. Cl. .............. 396/448; 396/535; 348/373; 348/374; 348/375
(58) Field of Classification Search .......... 396/348, 396/448, 529, 535; 348/373–375
See application file for complete search history.

(56) References Cited

U.S. PATENT DOCUMENTS 5,913,089 A * 6/1999 Ebe ....................... 396/448
6,748,168 B2 * 6/2004 Nishiwaki et al. ........... 396/176
6,799,905 B2 * 10/2004 Suzuki ....................... 396/448

FOREIGN PATENT DOCUMENTS

JP      2000029096 A    *   1/2000
JP      2004080151 A    *   3/2004

OTHER PUBLICATIONS

Machine translation of JP2000-029096A.*
Machine translation of JP 2004-080151A.*

* cited by examiner

*Primary Examiner*—Clayton E Laballe
*Assistant Examiner*—Linda B Smith
(74) *Attorney, Agent, or Firm*—Steven M. Reiss

(57) ABSTRACT

A cover assembly includes a main body, a control, an outer cover, a protective cover, and a transmitting member. The control is slidably mounted in the main body. The outer cover is detachably mounted in the main body. A protective cover is rotatably engaged in the outer cover. A transmitting member is rotatably mounted in the main body, with one end fixed on the control and another end engaging the protective cover. The control slides relative to the main body, and the transmitting member rotates the protective cover relative to the outer cover.

14 Claims, 4 Drawing Sheets

COVER ASSEMBLY

BACKGROUND

1. Field of the Disclosure

The present disclosure relates to cover assemblies, and particularly to a cover assembly for a camera module.

2. Description of Related Art

Electronic devices with a camera module mounted thereon are currently widely in use. However, most lenses of such modules remain exposed, allowing contamination and damage to occur. To protect the lens, a transparent cover is often fixed on the electronic device to protect the lens. However, with repeated use, the surface of the cover can attract and retain contaminants. Since the cover is fixed in the electronic devices, it is not easily cleaned, presenting problems for image quality and lens integrity.

Therefore, a cover assembly for a camera module is called for to overcome the described limitations.

BRIEF DESCRIPTION OF THE DRAWINGS

Many aspects of the disclosed cover assembly can be better understood with reference to the following drawings. The components in the drawings are not necessarily drawn to scale, the emphasis instead being placed upon clearly illustrating the principles of the present cover assembly, in which.

DETAILED DESCRIPTION OF THE EMBODIMENTS

A cover assembly as disclosed can be applied in an electronic device such as a mobile phone, personal digital assistant (PDA), or other device in accordance with the present disclosure.

Figure 1:
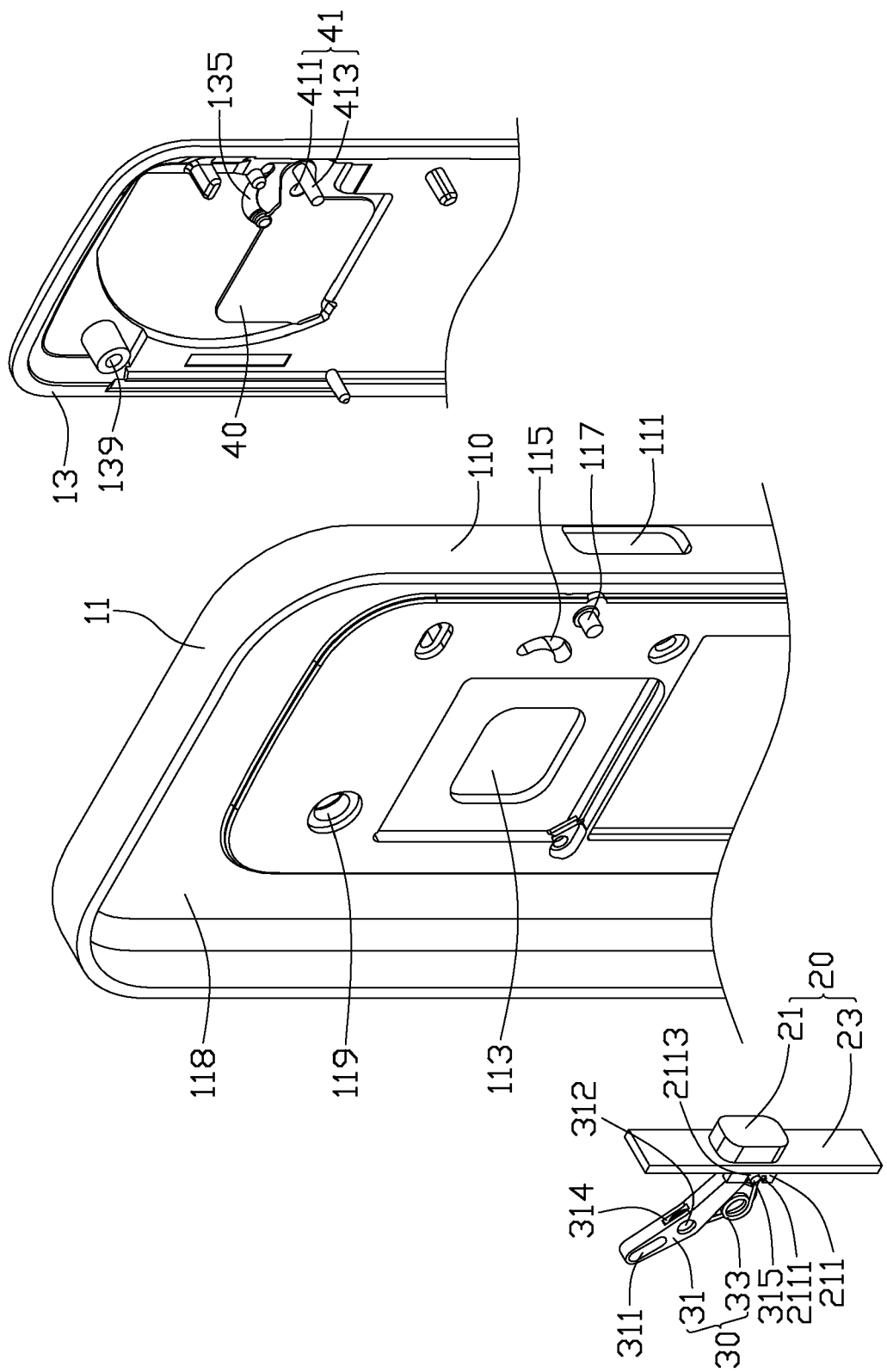
FIG. 1 is an exploded, isometric view of a cover assembly in accordance with an exemplary embodiment.

Referring to FIG. 1, a cover assembly includes a main body 11, an outer cover 13, a control 20, a transmission assembly 30, and a protective cover 40.

Figure 2:
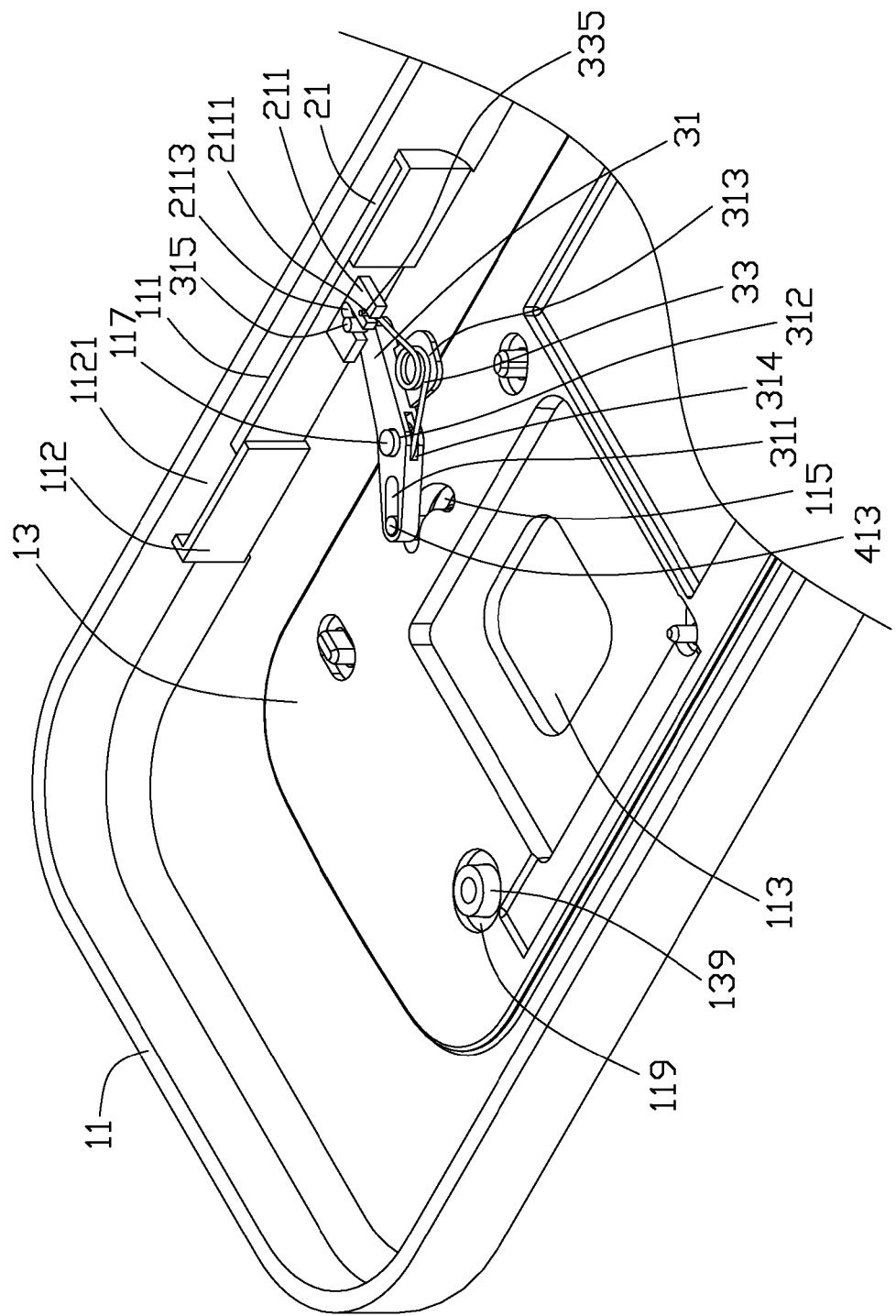
FIG. 2 is an assembled, isometric view of the cover assembly of FIG. 1.

The main body 11 includes a sidewall 110 and a bottom wall 118. The sidewall 110 defines a control hole 111. Referring to FIG. 2, two support plates 112 perpendicularly extend from the bottom wall 118 opposite to an inner side of the sidewall 110, and are symmetrically positioned at two sides of the control hole 111. Each support plate 112 is substantially L-shaped. The two support plates 112 with the sidewall 110 cooperatively define a cavity 1121. The bottom wall 118 of the main body 11 defines a rectangular opening 113 receiving a lens. An arcuate guide hole 115 is defined in the bottom wall 118 adjacent to the opening 113. A positioning pin 117 is formed on the bottom wall 118 between the guide hole 115 and the control hole 111. A plurality of fixed holes 119 are defined in the bottom wall 118 around the opening 113.

Figure 3:
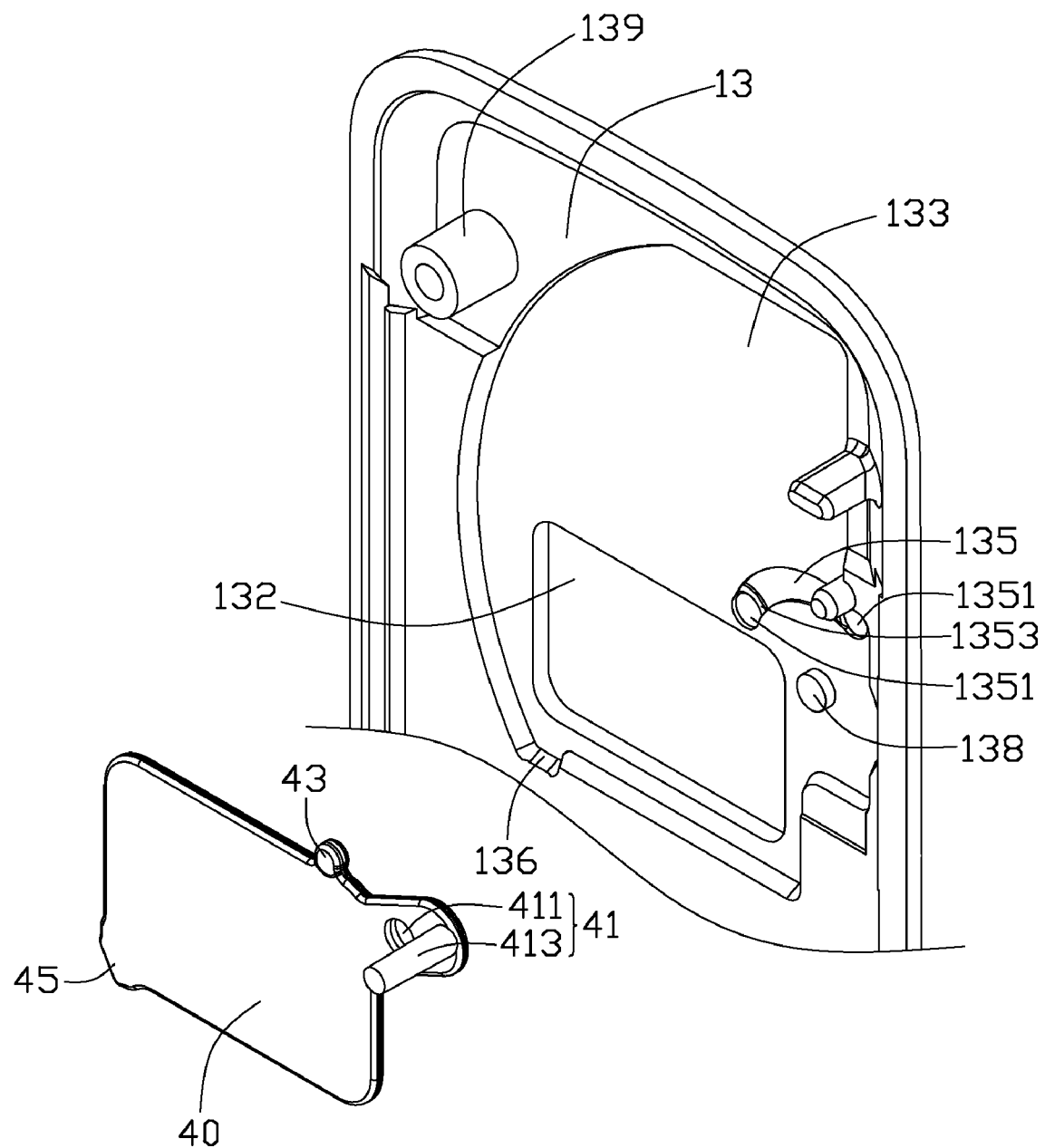
FIG. 3 is an enlarged view of an outer cover and the protective cover of FIG. 1.

Referring to FIG. 3, the outer cover 13 is mounted on the main body 11, providing protection for and access to a battery (not shown). The outer cover 13 is recessed to form a sector cavity 133. A through hole 132 is defined in a bottom surface of the cavity, receiving reflective light from the target object. An arcuate sliding groove 135 is defined in a substantially central area of the sector cavity 133, and is adjacent to the through hole 132. Two ends of the sliding groove 135 respectively define a locking groove 1351. A projection 1353 is positioned between the sliding groove 135 and the locking groove 1351. A shaft 138 is formed adjacent to the sliding groove 135. A peripheral wall of the cavity 133 defines a notch 136. The outer cover 13 forms a plurality of posts 139 received in corresponding fixed holes 119 of the main body 11.

The protective cover 40 is substantially rectangular, and forms an extending portion 41 at one corner thereof. The extending portion 41 defines a shaft hole 411 and forms a pin 413 adjacent to each other. The shaft hole 411 rotatably receives the shaft 138 of the outer cover 13. The pin 413 may be received in the guide hole 115 of the main body 11. A protrusion 43 is formed at an edge of the protective cover 40 and received in the locking groove 1351. An engaging portion 45 is formed at a corner opposite to the extending portion 41, locking in the notch 136 of the outer cover 13.

Figure 4:
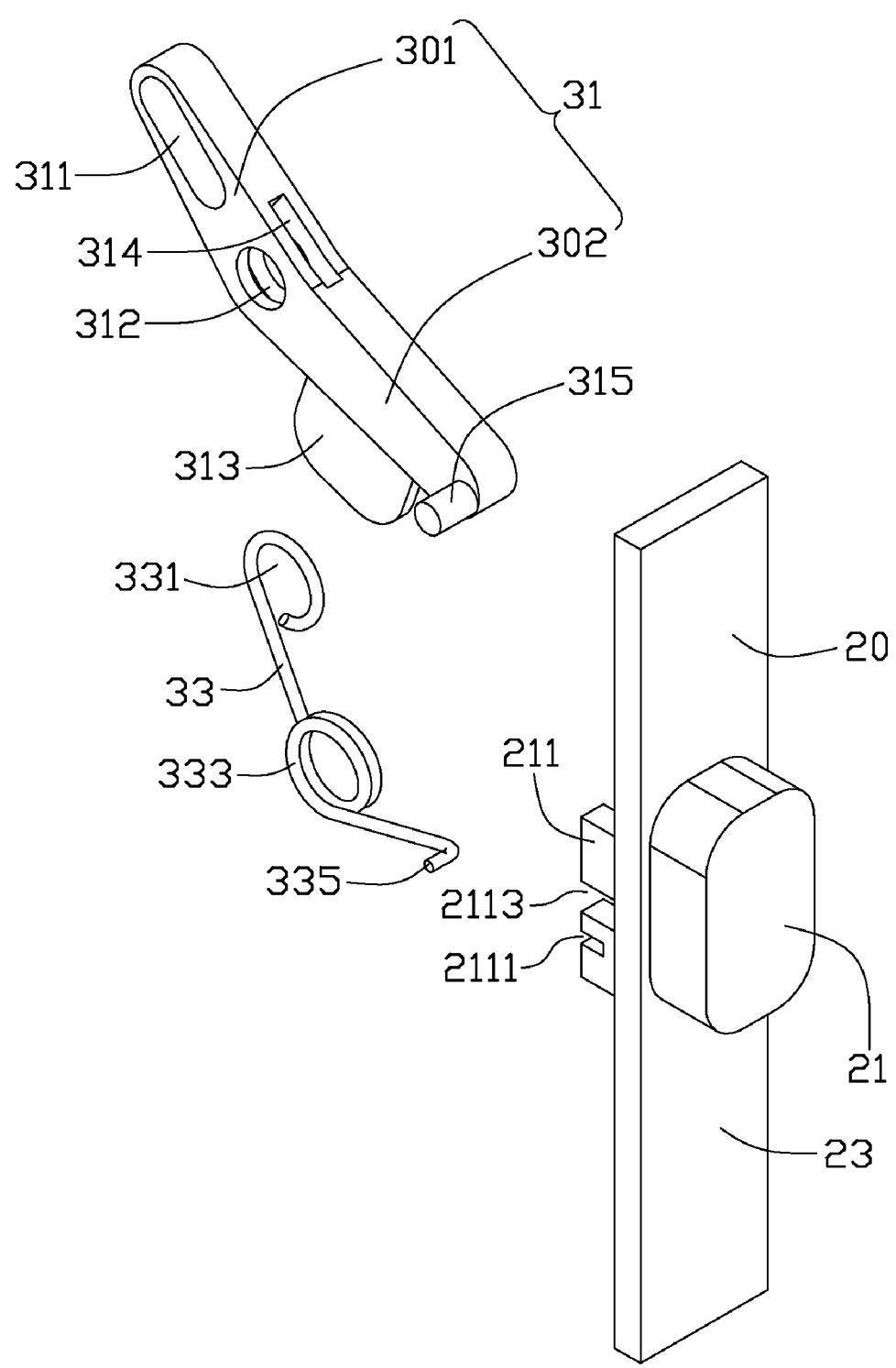
FIG. 4 is an enlarged, exploded view of a control and transmission assembly of the protective cover of FIG. 1.

Referring to FIG. 4, the control 20 includes an operating portion 21 and a main portion 23. The main portion 23 may be slidably received in the cavity 1121 of the main body 11. The operating portion 21 is formed at one side of the main portion 23, and may be received in the control hole 111 of the main body 11. A block 211 is formed at an opposite side of the main portion 23. The block 211 defines a first slot 2111 and a second slot 2113.

The transmission assembly 30 includes a transmitting member 31 and an elastic member 33. The transmitting member 31 includes a first board 301 and a second board 302 angled on the first board 301. The first board 301 defines a receiving hole 311 receiving the pin 413 of the protective cover 40. A latching hole 312 and a latching groove 314 are defined between the first board 301 and the second board 302. A wing board 313 extends from the second board 302, and a post 315 is formed at one end of the second board 302.

The elastic member 33 is bent by a wire, and includes a bent portion 331, a coiled portion 333, and an end portion 335. The bent portion 331 is bent from one side of the coiled portion 333 to be substantially circular, and the end portion 335 extends perpendicularly from the other side of the coiled portion 333.

In assembly of the protective cover 40 to the outer cover 13, the shaft hole 411 of the protective cover 40 receives the shaft 138 of the outer cover 13, and the protective cover 40 covers the through hole 132. The engaging portion 45 of the protective cover 40 is engaged in the notch 136 of the cavity 133. The protrusion 43 is locked in the locking groove 1351 and resists the projection 1353.

The control 20 and the transmission assembly 30 are subsequently assembled in the main body 13. The main portion 23 of the control 20 is slidably received in the cavity 1121, and the operating portion 21 is exposed from the control hole 111 of the main body 11. One end of the transmitting member 31 is positioned below the block 211. The post 315 is locked with the second slot 2113. The positioning pin 117 is engaged in the latching hole 312 of the transmitting member 31. The receiving hole 311 overlaps the guide hole 115. The end portion 335 is locked in the first slot 2111. The coiled portion 333 is positioned above the wing board 313. The bent portion 331 is received in the latching groove 314 and around the positioning pin 117. Finally, the outer cover 13 with the protective cover 40 is fixed to the main body 11, with posts 139 engaged in the fixed holes 119 and pin 413 passing through the guide hole 115 and the receiving hole 311. Thus, the assembly process of the protecting lens module is completed.

In use, the operating portion 21 is impelled to slide the main portion 23 in the cavity 1121. The transmitting member 31 rotates relative to the positioning pin 117 of the main body 11. Accordingly, the pin 413 of the protective cover 40 slides along the guide hole 115 and the elastic member 33 is deformed. Commensurately, the protective cover 40 rotates along the cavity 133. When passing over the projection 1353, the protrusion 43 slides along the sliding groove 135 entering another locking groove 1351. Thus, the protective cover 40 is moved to a stably open position.

Alternatively, the elastic member may have other configurations while remaining well within the scope of the disclosure.

It is to be noted that the cover assembly as disclosed is suitable for application with any portable electronic device including a camera module, and equally suitable for application with a digital camera or any other device utilizing a lens.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A cover assembly, comprising:
   a main body;
   a control slidably mounted in the main body;
   an outer cover detachably mounted in the main body;
   a protective cover rotatably engaged in the outer cover; and
   a transmitting member rotatably mounted in the main body, one end of the transmitting member fixed to the control and another end engaging the protective cover;
   wherein the control slides relative to the main body, and the transmitting member rotates the protective cover relative to the outer cover.

2. The cover assembly as claimed in claim 1, further comprising an elastic member, one end of which is fixed on the control and the other end is fixed on the transmitting member.

3. The cover assembly as claimed in claim 1, wherein the protective cover forms a pin, received in both a guide hole defined in the main body and a receiving hole defined in the transmitting member.

4. The cover assembly as claimed in claim 3, wherein the transmitting member defines a latching hole in a central area thereof receiving a positioning pin formed in the main body.

5. The cover assembly as claimed in claim 1, wherein the control includes a main portion integrally forming an operating portion on one side thereof, and a block formed at another side thereof.

6. The cover assembly as claimed in claim 5, further comprising an elastic member, wherein the block defines a first slot and a second slot, with one end of the elastic member fixed to the first slot, and one end of the transmitting member fixed to the second slot.

7. The cover assembly as claimed in claim 6, wherein the transmitting member includes a first board and a second board angled thereon, with a latching groove defined therebetween in which the other end of the elastic member is fixed.

8. The cover assembly as claimed in claim 7, wherein a wing board extends from the second board, above which the elastic member is disposed.

9. The cover assembly as claimed in claim 1, wherein the outer cover is recessed to form a cavity in which a sliding groove is defined and in which the protective cover rotates.

10. The cover assembly as claimed in claim 9, wherein two ends of the sliding groove respectively define a locking groove, a projection is positioned between the sliding groove and the locking groove, and the protective cover forms a protrusion releasably locked in the locking groove and sliding along the sliding groove.

11. The cover assembly as claimed in claim 9, wherein the outer cover forms a shaft adjacent to the sliding groove and received in a shaft hole defined in the protective cover.

12. The cover assembly as claimed in claim 11, wherein the cavity defines a notch in which an engaging portion formed on the protective cover is engaged.

13. The cover assembly as claimed in claim 1, applied in a portable electronic device.

14. The cover assembly as claimed in claim 1, applied in a digital camera.

* * * * *